Figure 1:
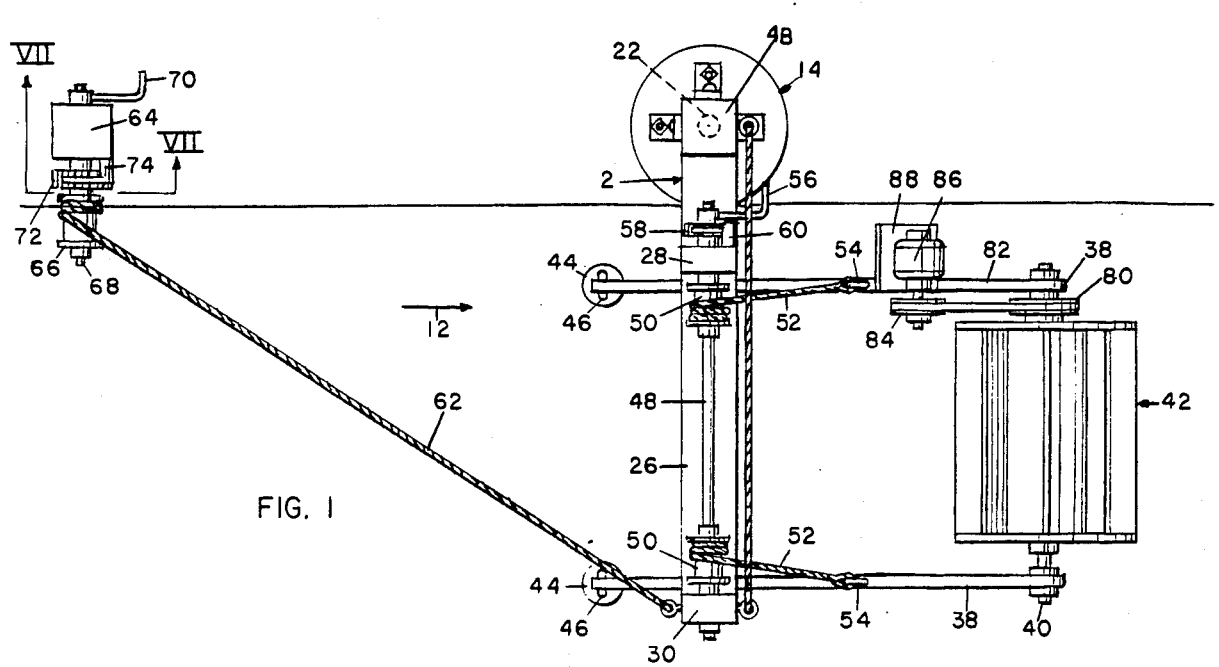

United States Patent [19]

Sedlacek

[11] Patent Number: 4,636,141
[45] Date of Patent: Jan. 13, 1987

[54] HYDROELECTRIC DEVICE

[76] Inventor: Raymond Sedlacek, P.O. Box 725, Payette, Id. 83661

[21] Appl. No.: 770,173

[22] Filed: Aug. 28, 1985

[51] Int. Cl.$^4$ ............................ F03B 7/00; B63H 1/38
[52] U.S. Cl. .................................. 416/86; 416/197 A; 416/207; 290/43; 290/54
[58] Field of Search ...................... 290/42–45, 290/52–55; 415/2, 3, 4, 7; 416/85, 86, 181, 197 A, 207; 417/330–334; 198/700–712

[56] References Cited

U.S. PATENT DOCUMENTS

| | | | |
|---|---|---|---|
| 618,148 | 1/1899 | Vance | 290/54 X |
| 658,969 | 10/1900 | Walter | 416/197 A X |
| 707,857 | 8/1902 | Marburg | 416/197 A X |
| 862,873 | 8/1907 | Baker | 416/86 |
| 1,074,292 | 9/1913 | Reynolds | 417/334 |
| 1,082,391 | 12/1913 | Barene | 198/703 |
| 1,460,495 | 8/1921 | Molander | 416/85 |
| 2,694,366 | 3/1951 | Miller | 198/702 |
| 4,467,218 | 8/1984 | Andruszkiw et al. | 290/43 X |

Primary Examiner—Peter S. Wong
Assistant Examiner—Emanuel Todd Voeltz
Attorney, Agent, or Firm—John A. Hamilton

[57] ABSTRACT

A hydroelectric device wherein a water wheel having radial paddle boards is partially submerged in a moving stream of water, and driven by the water current to operate an electric generator. The water wheel has end discs at its respective sides to block escape of water from between the paddle boards. The paddle boards are normally disposed at right angles to the current flow, but if the water current should flow faster at one side of the wheel than at the other, the ends of the boards at the slow-current side may be shifted forwardly, or the ends thereof at the fast-current side may be shifted rearwardly, having reference to the direction of current flow, in order that a portion of the water impinging against the fast-current ends of the boards will be deflected to the slow-current side. This adjustment may be made either by shifting the position of the wheel relative to the water bodily, or by shifting the paddle boards relative to the wheel. Also, adjustable vent openings are provided in the end discs adjacent each paddle board, to bleed off excess water at the fast-current side in the event sufficient water cannot be shifted to the slow-current side by angling of the paddle boards.

9 Claims, 8 Drawing Figures

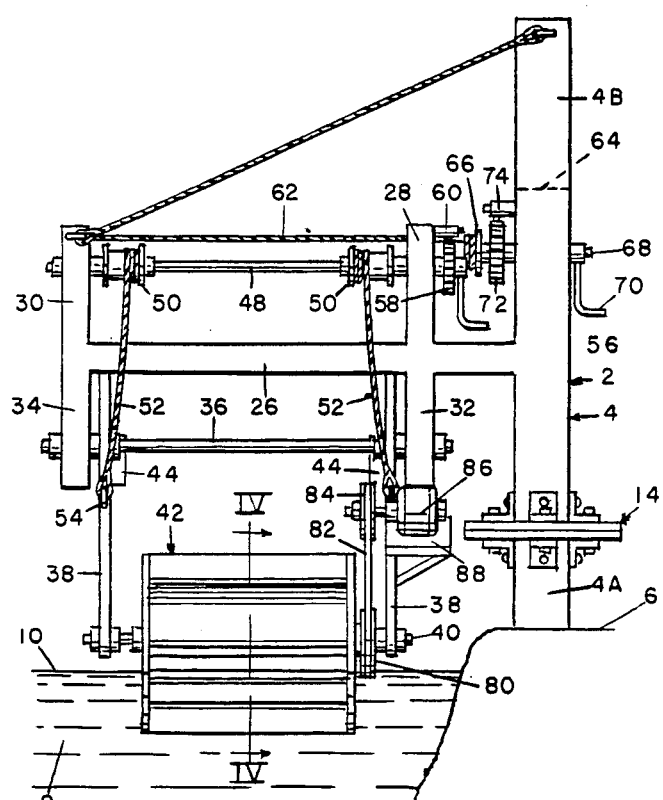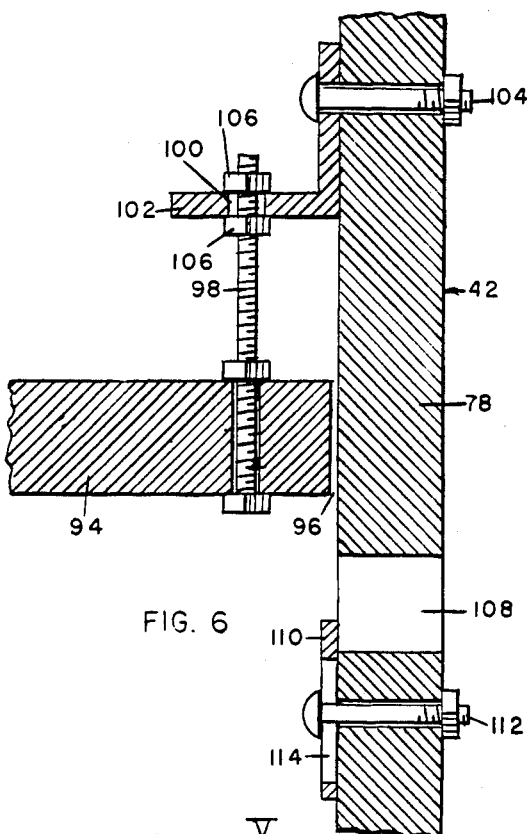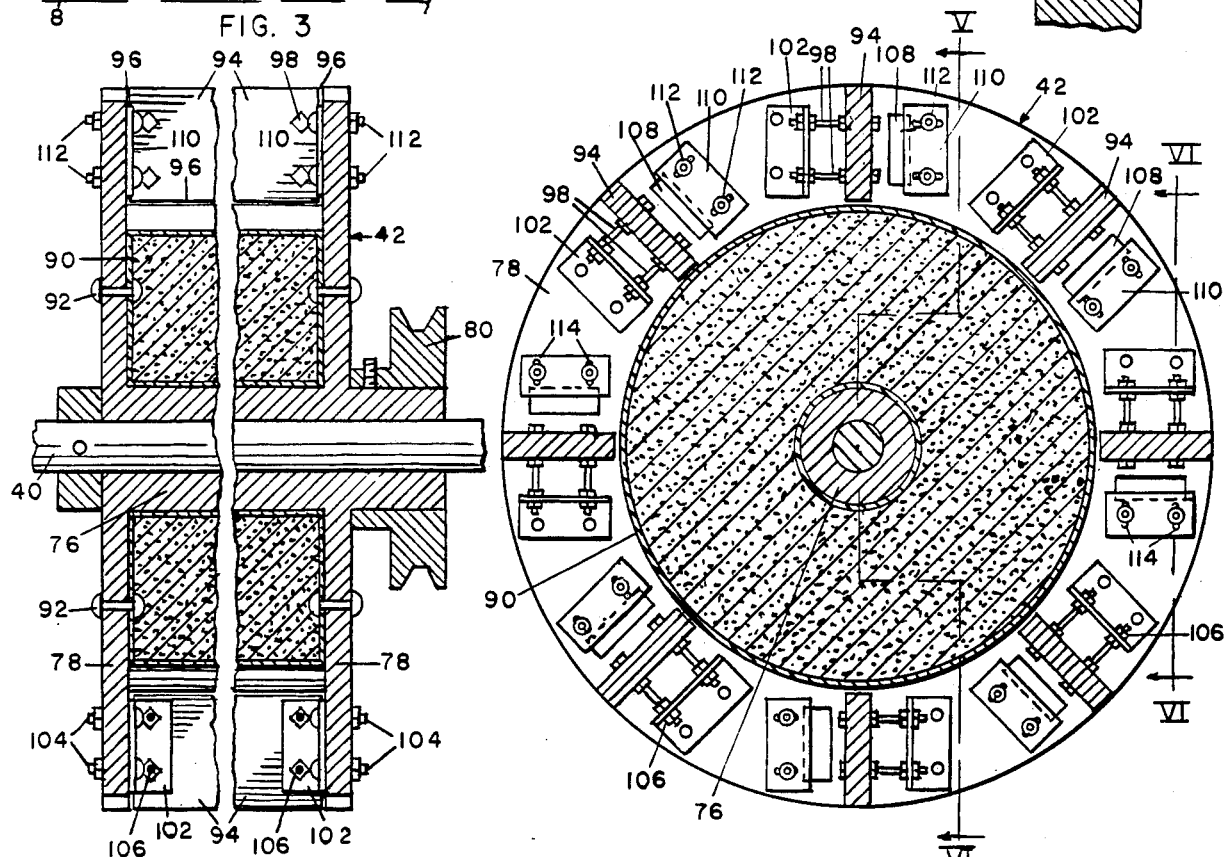

HYDROELECTRIC DEVICE

This invention relates to new and useful improvements in hydroelectric devices wherein electric energy is generated by a generator driven by a water wheel turned by the kinetic energy of a stream, river or other moving body of water, and is an improvement over the device shown in my prior application Ser. No. 06/487,961, filed Apr. 24, 1983, and now abandoned.

The device shown in said prior application, while generally effective for its intended purposes, was found to have a substantial defect under certain circumstances, namely that its power output was substantially reduced if the water current speed at the respectively opposite sides of the wheel were not equal. The wheel consists of a generally drum-like form having paddle boards spaced circumferentially around its periphery, the paddle boards extending from side to side of the wheel with their planes disposed radially of the drum, the drum also having end discs preventing or inhibiting the escape of water at the sides of the wheel. If the water speed is greater at one side of the wheel than at the other, due to inherent flow conditions in the river or stream being used, or to nearby flow obstructions in the stream, or to any other cause, the current will tend to turn that side of the wheel at one higher speed, and to turn the side of the wheel at which the current is slower at a lower speed. Since the wheel is unitary its respective sides of course cannot turn at different speeds. The wheel strongly resists turning at any speed higher than that at which it would be turned by the current at the side thereof at which the current is slowest, since to do so would tend to cause "voids", or cavitation, of the water at that side of the wheel. Hence the entire wheel is caused to turn at a lower speed than that at which it would have been turned by the current at the side of the wheel at which the current speed is greater, with the result that that side of the wheel is supplied with an excess quantity of water, which is spilled outwardly from the wheel and its kinetic energy wasted. The overcoming of this defect, whereby both sides of the water wheel receive equal quantitites of water despite any inequality of current speeds at its respective sides, is the principal object of the present invention.

Generally, this object is accomplished by either of two different means, which may also be used in conjunction with each other to provide a greater degree of adjustment. First, means are provided whereby the paddle boards may be individually adjusted to a non-parallel relation to the wheel axis, so that the end of each board at one of the end discs leads the end thereof at the other of the end discs, considered circumferentially of the wheel. Ordinarily, the boards will be arranged with their leading ends at the end disc forming the end of the wheel at which the current is slower. Thus the board will deflect a portion of the water impinging against its opposite end portion, at the side of the wheel at which the current speed is higher, toward its leading end, where it will fill the cavitation tending to be created adjacent said leading end, thus relieving the "braking" effect of the cavitation and permitting the wheel to turn at a higher speed. Second, and normally intended for use only when the above described inclination of the paddle boards cannot provide full equalization of water supply to both sides of the wheel, vents may be provided in the end discs adjacent the face of each of the paddle boards against which the stream current impinges. Means are also provided for adjustably covering each of the vent openings. Whenever the fast-current side of the wheel still is receiving an excess water supply after as much water as possible is being diverted to the slow-current side of the wheel by the described inclination of the paddle boards, the vents at the fast-current side may be opened to divert the excess outwardly from the wheel. Of course this diversion represents a loss of some of the energy of the moving water, but it has been found that the overall power output of the wheel will still be improved if the water delivery rate to the entire width of the wheel is equalized.

Another shortcoming of the device shown in my prior application above identified is the difficulty of servicing and repair. Being disposed entirely above water, servicing and repair required the building of expensive catwalks or the like for service personnel. Accordingly, another object of the present invention is the provision of supporting means for the water wheel which, if the device is mounted at the shore of a river or stream, permits the entire wheel to be swung inshore, over land, to facilitate any necessary servicing.

Other objects are simplicity and economy of construction, and efficiency and dependability of operation.

Figure 2:
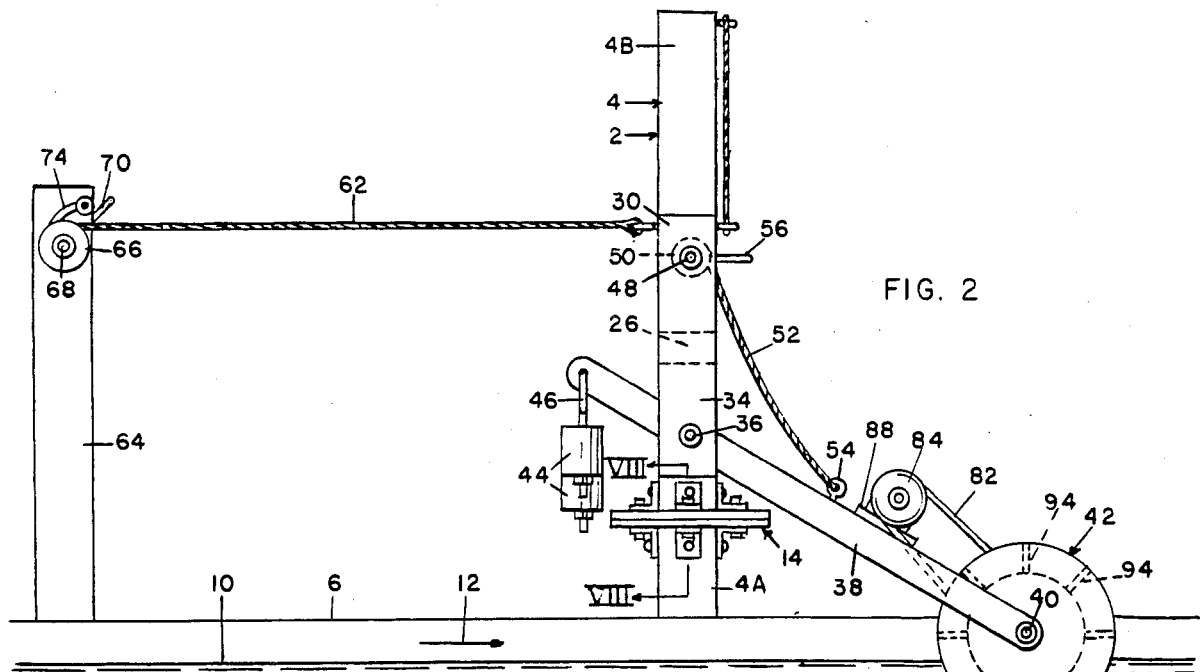
Figure 7:
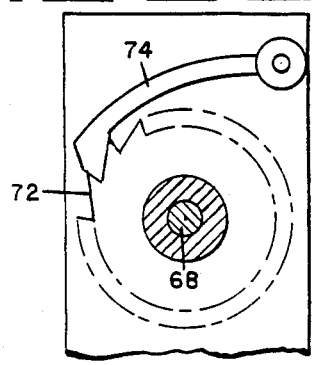
Figure 8:
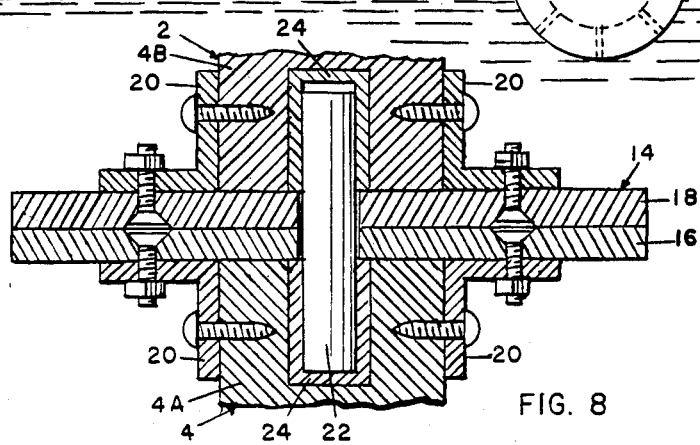

With these objects in view, as well as other objects which will appear in the course of the specification, reference will be had to the accompanying drawing, wherein:

FIG. 1 is a top plan view of a hydroelectric device embodying the present invention, with certain details of the water wheel omitted for clarity, FIG. 2 is a side elevational view of the device as shown in FIG. 1, FIG. 3 is a front elevational view of the device as shown in FIG. 1, FIG. 4 is an enlarged sectional view of the water wheel only, taken on line IV—IV of FIG. 3 and showing details of construction omitted from FIGS. 1–3, FIG. 5 is a foreshortened sectional view taken on line V—V of FIG. 4, FIG. 6 is an enlarged, fragmentary sectional view taken on line VI—VI of FIG. 4, FIG. 7 is an enlarged, fragmentary sectional view taken on line VII—VII of FIG. 1, and FIG. 8 is an enlarged, fragmentary sectional view taken on line VIII—VIII of FIG. 2.

Like reference numerals apply to similar parts throughout the several views, and the numeral 2 applies generally to a water wheel supporting frame including a vertical post 4 fixed at its lower end in the ground 6 adjacent a moving stream of water 8, the water level being indicated at 10, and the direction of the current being indicated by arrow 12 in FIGS. 1 and 2. Post 4 consists of a lower portion 4A fixed in the ground, and an upper portion 4B coaxial with the lower portion and connected thereto by a vertical swivel connection indicated generally by the numeral 14 and consisting, as best shown in FIG. 8, of a pair of heavy, horizontal circular plates 16 and 18 affixed respectively to lower post section 4A and upper section 4B by brackets 20, said plates having wiping contact and being maintained in concentric relation by a vertical kingpin 22 rotatably engaged in sockets 24 fixed in the post sections. Thus the upper post section 4B may be turned on its vertical axis.

A heavy boom 26 is affixed at one end to post 4, well above water level 10, and normally extends horizontally outwardly over the water. Said boom is provided with a pair of spaced apart uprights 28 and 30, respectively adjacent but spaced apart from post 4 and at its outer end, extending upwardly therefrom, and a pair of depending uprights 32 and 34 aligned respectively with uprights 28 and 30. A horizontal shaft 36, disposed beneath and parallel to boom 26, extends between and is mounted in lower uprights 32 and 34, and a pair of water wheel carrier arms 38 are pivoted intermediate their ends on said shaft, respectively adjacent the two uprights. Said carrier arms normally incline downwardly and forwardly, as best shown in FIG. 2, and a water wheel shaft 40 extends horizontally therebetween and is mounted therein at their forward ends, being parallel to shaft 36. A water wheel indicated generally by the numeral 42, containing important subject matter of the present invention which will be fully described hereinafter, is mounted axially and rotatably on shaft 40, and as will appear dips below water level 10 to be turned by the current of the water, with shaft 40 disposed at least somewhat above the water level. At its rearward end, behind boom 26, each of carrier arms 38 has a weight 44 suspended therefrom by means of a hanger 46, in order to partially counterbalance the weight of the water wheel. A horizontal shaft 48, disposed above and parallel to boom 26, extends between and is rotatably in uprights 28 and 30. Fixed on said shaft between the uprights are a pair of cable drums 50, respectively adjacent the two uprights. A cable 52 wound on each of said drums is extended downwardly and forwardly and connected to the associated carrier arm 38 forwardly of shaft 36, as at 54. A manual crank 56 is fixed on one end of shaft 48, in order that drums 50 may be turned to pivot carrier arms 38 upwardly to lift water wheel 42 out of the water. Also fixed on shaft 48 is a ratchet wheel 58 controlled by a pawl 60 operable to permit rotation of drums 50 in a direction to elevate the water wheel, but to lock said drums against opposite rotation except when the pawl is released manually. To prevent sagging of boom 26 under the weight of the elements carried thereby, a bracing cable is extended between the upper end of post 4, which extends well above the boom, and upright 30, as best shown in FIG. 3. To prevent the water wheel from being moved downstream by the drag of the water current thereon, another cable 62 is attached to upright 30 and extended upstream to a second post 64 also affixed in the ground, where it is wound on a cable drum 66 affixed to a shaft 68 journalled rotatably in said post. Drum 66 is manually rotatable by means of a crank 70, and controlled by a ratchet wheel 72 and pawl 74 in the same manner as drums 50 are controlled by ratchet wheel 58 and pawl 60, and as detailed in FIG. 7.

Details of water wheel 42 are shown in FIGS. 4, 5 and 6. It includes a tubular hub 76 rotatable on shaft 40, and having end discs 78 having the full diameter of the water wheel. Also fixed on hub 76 is a pulley wheel 80, disposed at one side of the water wheel and operably connected by means of a flexible belt 82 to a second pulley wheel 84 fixed on the drive shaft of an electric generator 86 mounted on a platform 88 affixed to one of carrier arms 38, so that rotation of the water wheel drives the generator. The counterweight 44 suspended from that carrier arm may be larger and heavier than that suspended from the other carrier arm, in order to compensate for the additional weight of the generator, in order to maintain the water wheel axis horizontal. Extending between the end discs 78 of the water wheel, and concentric with hub 76 thereof, is an annular cylindrical tank 90, which may be secured to the end discs as by rivets 92. Said tank renders the entire water wheel buoyant, being rendered so either by completely sealing it against the entry of water, or as shown, by filling it with a lightweight waterproof foam material such as that known commercially as Styrofoam. The buoyancy of the water wheel should be so balanced against the mass of counterweights 44 that when cables 52 are slack, the water wheel will float with its shaft 40 somewhat above water level 10, as shown in FIGS. 2 and 3.

The diameter of tank 90 is less than that of end discs 78, and a series of paddle boards 94, spaced regularly about the periphery of the wheel, extend between the end discs outwardly of said tank, the planes of said paddle boards being disposed radially of the wheel. The outer edges of the paddle boards are flush with the peripheries of the end discs, and their inner edges extend along the surface of the tank. However, the paddle boards are not affixed directly either to the end discs or the tank, there being sufficient clearance between their inner edges and the tank, and between their ends and the end discs, as shown at 96 in FIGS. 4, 5 and 6, to permit relative movement therebetween. At each end of each paddle board, a pair of bolts 98 are fixed therein, and extend at right angles to the board through loosely fitting holes 100 (see FIG. 6) provided therefor in an angle bracket 102 affixed to the adjacent end disc 78 by bolts 104. Each bolt 98 is adjustably fixed in its bracket 102 by a pair of lock nuts 106 threaded thereon at opposite sides of the bracket. Thus by loosening said lock nuts, either end of the board may be moved substantially circumferentially of the wheel, so that the board is angled in a direction longitudinal to the wheel, rendering it non-parallel to the wheel axis. Also, a vent hole 108 is formed in each of end discs 78 at each end of each paddle board, adjacent the face of said board against which the water current normally impinges during rotation of the wheel. Each of said vent holes may be adjustably covered by a plate 110 clamped to the inner surface of the end disc by a pair of bolts 112. Said bolts extend through slots 114 of the plate 110, so that by loosening said bolts, said plate may be moved to cover the vent hole to adjustably different degrees.

In operation, the device is readied for use by first operating crank 70 to swing boom 26 on swivel 14, with water wheel 42 elevated above water level 10, until the axis of the water wheel is disposed accurately at right angles to the direction of current flow, as indicated by arrow 12. The site for installation of the device is of course selected to provide current as free as possible from eddies, cross currents and the like. The water wheel is then lowered into the water by operation of crank 56 until it floats freely, sufficient slack being introduced into cables 52 that the water wheel will float freely despite changes in the water level. The water wheel will then have the position in the water best shown in FIG. 2, and will maintain that relative position even if the water level should rise or fall, without attention by the user. The wheel will then be turned in a counterclockwise direction, as viewed in FIG. 2, by impingement of the water against the rearward faces of its paddle boards 94, and will operate through belt 82 to drive generator 86.

If the electrical output of the generator is not as high as would appear to be normal with water current of a given speed, which is a fact which can be determined by the use of simple empirical tables, this may indicate that the current speed at one side of the wheel is different from the current speed at the other side of the wheel. This condition results in the rotation of the wheel being braked by the resistance to cavitation of the water at the slow-current side of the wheel, as previously discussed, and may be alleviated by adjusting bolts 98 supporting the paddle boards to advance the ends of the paddle boards forwardly at the slow-current side of the wheel, or to retract the ends of the paddle boards rearwardly at the fast-current side of the wheel, or both. This deflects a portion of the water impingeing against the paddle boards at the fast-current side of the wheel toward the slow-current side, where it tends to "fill in" any cavitation tending to occur at the slow-current side, thus relieving the wheel of the braking action of such cavitation and permitting the wheel to turn at a greater speed to increase the output of the generator. The faster current usually, but not necessarily, occurs at the side of the water wheel farthest from the shoreline of the stream. Some correction for this condition ma be obtained without adjusting the paddle boards in the wheel, by turning crank 70 slightly to angle the entire wheel laterally of the current. Adjustment of the paddle boards may be accomplished relatively easily by first operating crank 56 to elevate the water wheel well above the water, and then operating crank 70 to pay out cable 62 to allow the water wheel to be swung entirely inshore, to provide easy access thereto.

However, even after inclining the paddle boards 94 as described above to the maximum practical extent, that is, for example, without opening clearances 96 between the paddle boards and tank 90 to an excessive degree, not enough water may have been deflected from the fast-current side to the slow-current side of the wheel to provide a uniform supply of water across the entire width of the wheel, especially when the current speed differential across the wheel is great. That is, the water supply to the fast-current side of the wheel may still exceed the water supply to the low-current side. In this circumstance, vents 108 at the fast-current side of the wheel may be adjustably opened by loosening bolts 112 and sliding plates 110 to uncover said vents to a desired degree. This causes a portion of the water at the fast-current side of the wheel to spill outwardly through said vents. This reduces the proportion of the water at the fast-current side of the wheel which must be deflected to the slow-current side to achieve a uniform water supply across the width of the wheel, and thus permits the desired balance to be obtained. This spillage of water at the fast-current side of the wheel of course represents a direct loss of energy, and thus should not be reverted to if the desired balance can be obtained without opening the vents, and solely by inclining the paddle boards as previously described. Nevertheless, it has been found that the overall power output of the wheel is still higher, even with this loss, than if it is allowed to operate with the braking action of cavitation, or incipient cavitation, resulting from insufficient water supply to the slow-current side thereof.

While I have shown and described a specific embodiment of my invention, it will be readily apparent that many minor changes of structure and operation could be made without departing from the spirit of the invention.

What I claim as new and desire to protect by Letters Patent is:

1. A hydroelectric device comprising:

a. a water wheel having radially extending paddle boards at angular intervals about its periphery, each paddle board normally lying in a plane including the axis of the wheel, b. a supporting structure carrying said water wheel and operable to support it for axial rotation with its lower portion submerged in a moving stream of water, with its axis horizontal and normally transverse to the water current, whereby said water wheel is turned by said water current, c. an electric generator mounted on said supporting structure and operably driven by rotation of said water wheel, and d. adjusting means operable to move the respectively opposite ends of each of said paddle boards, at the respectively opposite sides of said wheel, either forwardly or rearwardly, having reference to the direction of current flow, whereby if the current speed at one side of the wheel is greater than at its opposite side, a portion of the water impinging against said paddle boards at the fast-current side of the wheel may be deflected toward the slow-current side of the wheel.

2. A hydroelectric device as recited in claim 1 wherein said water wheel is buoyant, so as to float with its lower portion submerged in said stream of water, and wherein said supporting structure is operable to permit free vertical movement of said water wheel, whereby to permit it to rise and fall with the water level, but to restrain it from bodily horizontal movement with the water current.

3. A hydroelectric device as recited in claim 1 wherein said adjusting means comprises elements of said supporting structure operable to permit bodily horizontal movement of said water wheel to move its axis into non-right angled relation to the water current.

4. A hydroelectric device as recited in claim 3 wherein said supporting structure comprises:

a. a fixed vertical post, b. a swivel joint interposed in said post whereby the upper portion of said post may be turned on a vertical axis, and c. a horizontal boom fixed to the upper portion of said post and extending outwardly therefrom, said water wheel being carried by said boom, and wherein said adjusting means comprises means whereby the upper portion of said post may be turned to any desired degree on said swivel joint.

5. A hydroelectric device as recited in claim 1 wherein said adjusting means comprises means whereby the respectively opposite ends of each of said paddle boards, at the respectively opposite sides of the wheel, may be moved either forwardly or rearwardly, having reference to the direction of current flow, in a direction generally circumferential to the wheel, relative to the wheel itself.

6. A hydroelectric device as recited in claim 1 wherein said water wheel comprises:

a. a central core, said paddle boards being disposed outwardly of said core, and b. a pair of end discs disposed at the respectively opposite sides of the wheel, and having diameters generally flush with the outer edges of the paddle boards, said paddle boards being movable relative to both said core and said end discs but with only slight clearance therebetween, said adjusting means comprising means affixing each end of each of the paddle boards to the adjacent end disc but being adjustable to provide forward or rearward movement of the paddle board end, having reference to the direction of current flow, in a direction generally circumferential to the wheel.

7. A hydroelectric device as recited in claim 6 wherein said means affixing each end of each of said paddle boards to the adjacent end disc comprises one or more bolts affixed in said paddle board and extending at right angles to the plane thereof, a mounting member affixed to the end disc through which said bolt extends, and lock nuts threaded on said bolt at the respectively opposite sides of said mounting member.

8. A hydroelectric device as recited in claim 6 with the addition of:

a. a vent opening formed through each of said end discs adjacent the ends of each of said paddle boards, at the face of said board against which water normally impinges during rotation of the wheel by the water current, and b. adjustable means operable to close each of said vent openings to any desired degree.

9. A hydroelectric device as recited in claim 8 the adjustable vent closure means comprises:

a. a closure plate fixed to the associated end disc and movable to cover the vent opening to any desired degree, and b. means operable to fix said closure plate to said end disc at any desired position thereof.

* * * * *